US 8,570,924 B2

(12) United States Patent
Gerstenberger et al.

(10) Patent No.: US 8,570,924 B2
(45) Date of Patent: Oct. 29, 2013

(54) METHOD AND ARRANGEMENT FOR ACTIVITY DETECTION IN A TELECOMMUNICATION SYSTEM

(75) Inventors: Dirk Gerstenberger, Kista (SE); Stefan Parkvall, Stockholm (SE); Johan Bergman, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 888 days.

(21) Appl. No.: 12/091,997

(22) PCT Filed: Oct. 31, 2006

(86) PCT No.: PCT/SE2006/050443
§ 371 (c)(1),
(2), (4) Date: Apr. 29, 2008

(87) PCT Pub. No.: WO2007/053106
PCT Pub. Date: May 10, 2007

(65) Prior Publication Data
US 2008/0261530 A1    Oct. 23, 2008

(30) Foreign Application Priority Data
Oct. 31, 2005    (SE) ...................................... 0502425

(51) Int. Cl.
*G08C 17/00* (2006.01)
*H04W 4/00* (2009.01)
*H04B 1/16* (2006.01)
*H04B 7/00* (2006.01)
*H04L 12/43* (2006.01)

(52) U.S. Cl.
USPC ........ 370/311; 370/328; 370/459; 455/343.4; 455/422.1; 455/522; 455/528

(58) Field of Classification Search
USPC ............ 370/311, 328; 455/422.1, 522, 343.4
See application file for complete search history.

(56) References Cited

U.S. PATENT DOCUMENTS

| 7,336,638 B2* | 2/2008 | Cheng et al. .................. 370/338 |
| 7,444,169 B2* | 10/2008 | Ishii et al. ..................... 455/561 |
| 7,522,924 B2* | 4/2009 | Abeta et al. ................ 455/452.2 |
| 2002/0006805 A1* | 1/2002 | New et al. ....................... 455/525 |
| 2004/0100918 A1* | 5/2004 | Toskala et al. ................ 370/314 |
| 2005/0063304 A1* | 3/2005 | Sillasto et al. ................ 370/229 |

(Continued)

OTHER PUBLICATIONS

Ericsson: "Transition between periods of activity and inactivity for continuous connectivity", 3GPP Draft, R1-051449, 3RD Generation Partnershp Project (3GPP). Mobile Competence Centre; 650, Route Des Lucioles F-06921 Sophia-Antipolis Cedex: France, vol. RAN WG1, No. Seoul, Korea; Nov. 1, 2005, XP050101039. [retrieved on Nov. 1, 2005].

*Primary Examiner* — Alpus H Hsu
*Assistant Examiner* — Yee Lam

(57) ABSTRACT

The present invention relates to a method and arrangement for efficient use of network resources, in particular for continuous connectivity services. The present invention introduces a set of established rules for uplink and/or downlink activity detection such that a Node B and/or a UE is enabled to detect active and inactive transmission periods on links for reception of packet data transmission and can independently arrange for inactivity/activity state transitions without any need of further signalling. Such a set of rules can be communicated to the Node B and the user equipment, e.g., from the radio network controller (RNC), or can consist of a predefined set of fixed rules that is readily implemented in said units.

23 Claims, 3 Drawing Sheets

(56) References Cited

U.S. PATENT DOCUMENTS

2005/0186983 A1* 8/2005 Iochi .............................. 455/522
2006/0003784 A1* 1/2006 Chion et al. .................. 455/518
2006/0062237 A1* 3/2006 Kim .............................. 370/432
2009/0201885 A1* 8/2009 Kuroda et al. ................ 370/335
2009/0305712 A1* 12/2009 Franceschini et al. ........ 455/450

* cited by examiner

METHOD AND ARRANGEMENT FOR ACTIVITY DETECTION IN A TELECOMMUNICATION SYSTEM

FIELD OF THE INVENTION

The present invention relates to methods and arrangements in a $3^{rd}$ generation telecommunication system, in particular to an activity detection to achieve interference reduction for systems applying High-Speed Downlink Packet Access (HS-DPA) and/or Enhanced Uplink (EUL) and to achieve UE power savings.

BACKGROUND OF THE INVENTION

Packet-oriented features like High-Speed Downlink Packet Access (HSDPA) and Enhanced Uplink (EUL) in a Universal Mobile Telecommunication System (UMTS) will promote the subscribers' desire for continuous connectivity. Continuous connectivity implies that users stay connected over a long time span, however with only occasional active periods of data transmission, in order to avoid frequent connection terminations and re-establishments causing inherent overheads and delays. This is the perceived mode that a subscriber is used to in fixed broadband networks (e.g. DSL) and a precondition to attract users from fixed broadband networks.

In order to support a high number of HSDPA users in the code limited downlink, a fractional DPCH (F-DPCH) has been introduced in release 6 of the 3GPP specifications. In the uplink on the other hand the limiting factor for supporting a similarly high number of E-DCH users is the noise rise. For high numbers of users in the cell it can be assumed that many users are not transmitting any user data for some time, e.g. for reading during web browsing or in between packets for periodic packet transmission such as VoIP. The corresponding overhead in the noise rise caused by maintained control channels will significantly limit the number of users that can be efficiently supported. As completely releasing of dedicated channels during periods of traffic inactivity would cause considerable delays for re-establishing data transmission and a corresponding bad user perception, the impact of control channels on uplink noise rise is to be reduced while maintaining the connections and allowing a much faster reactivation for temporarily inactive users. This is intended to significantly increase the number of packet data users, i.e. HS-DSCH/E-DCH users without UL DPDCH, in an UMTS FDD system that can stay in CELL_DCH state over a long time period without degrading the cell throughput and that can restart transmission after a period of inactivity with a much shorter delay (<50 ms) than would be necessary for re-establishment of a new connection.

The enhanced uplink concept, as illustrated in FIG. 2, implies the introduction of several channels from each user equipment for transmission in the uplink direction. The DPCCH carries pilot symbols and parts of the outband control signalling. Remaining outband control signalling for the enhanced uplink is carried on the E-DPCCH while the E-DPDCH carries the data transmitted using the enhanced uplink features. The HS-DPCCH carries the positive and negative acknowledgements (ACK/NACK) related to the HSDPA downlink transmissions and Channel Quality Indicators (CQI) to inform the Node B about the downlink channel conditions that are experienced by a particular user equipment. Similarly to the uplink in earlier releases of the WCDMA standard, the enhanced uplink uses inner and outer loop power control (OLPC). The power control mechanism ensures that a user equipment does not transmit with higher power than required for a successful delivery of the transmitted data (possibly using multiple transmission attempts). This ensures stable system operation and efficient radio resource utilization.

The document 3GPP TR 25.903 "Continuous Connectivity for Packet Data Users" issued by the $3^{rd}$ Generation Partnership project (3GPP) discusses the following concepts:

SIR_target lowering: This proposed concept has the goal of substantially reducing the Tx power of the UL DPCCH, and thus the generated noise rise, by lowering the target parameter SIR_target for the signal-to-interference ratio (SIR) during idle traffic periods, i.e. when nothing needs to be transmitted in the uplink on the E-DPDCH. It is an important characteristic of this concept that these changes do not involve the radio network controller (RNC), so that the long delays of RRC or NBAP procedures (>>100 ms) are avoided and the user is staying in the CELL_DCH state. There are two different approaches how such a "SIR_target lowering" could be carried out: According to a first approach the serving Node B controls when a user equipment is going into an inactive phase with a lower SIR_target and a corresponding L1 signalling is used to trigger deactivation and reactivation. According to a second approach the user equipment controls, by help of a L2 MAC-e signalling, when the SIR_target in the Node Bs of the active RLS is lowered, i.e. deactivation and reactivation.

CQI off: This proposed concept has the goal to reduce the Tx power of the user equipment by stopping the reporting of Channel Quality Information (CQI), and thus eliminating the interference from HS-DPCCH in the uplink, when no data is transmitted on HS-PDSCH in downlink. Also here it is an important characteristic of this concept that these changes do not involve the radio network controller (RNC), so that the long delays of RRC or NBAP procedures (>>100 ms) are avoided and the user is staying in CELL_DCH state. There are two different approaches how the "CQI off" could be carried out: According to a first approach the serving Node B controls when a user equipment is going into an inactive phase with CQI off and a corresponding L1 signalling is used to trigger deactivation and reactivation. According to a second approach the user equipment controls CQI off by L2 MAC-e signalling to the Node Bs of the active RLS, i.e. deactivation and reactivation.

DPCCH gating: This concept follows the basic principle that, if there is neither E-DCH nor HS-DPCCH transmission, the user equipment automatically stops the continuous DPCCH transmission and applies a known DPCCH activity (DPCCH on/off) pattern. When an E-DCH or HS-DPCCH transmission takes place also the DPCCH is transmitted regardless of the activity pattern.

Other concepts consider that decisions about activity/inactivity are taken in the user equipment and communicated to the Node Bs using L2 signalling.

SUMMARY OF THE INVENTION

The present invention addresses the problem that previously known solutions as described above rely on the usage of a low layer signalling, e.g. using specific bit patterns on the HS-DSCH, from a transmitting unit to a receiving unit in order to inform the receiving unit about a packet traffic inactivity or activity that has been detected in the transmitting unit with regard to the data transmission to said receiving unit. This, however, requires a frequent and error prone signalling and further contributes to code shortage and Node B transmit power limitations.

It is thus an object of the present invention to achieve a method and arrangement providing an efficient use of network resources, e.g. in terms of signalling load, code usage, and/or power consumption, in particular in cells with an assumed high number of users demanding continuous connectivity services.

It is the basic idea of the present invention to provide improved efficiency-promoting concepts that can be implemented without requiring any explicit signalling. Thus, the present invention aims to avoid frequent, error-prone, and resource consuming low layer signalling between network units, i.e. Node B and UE, to coordinate the transitions from active periods to inactive periods and vice versa. Instead of relying on signalling, the present invention introduces a set of established rules for uplink and/or downlink activity detection such that a Node B and a UE are enabled to detect active and inactive transmission periods on links for reception of packet data transmission and can independently arrange for inactivity/activity state transitions without any need of further signalling. Such a set of rules can be communicated to the Node B and the user equipment, e.g., from the radio network controller (RNC), or can consist of a predefined set of fixed rules that is readily implemented in said units.

The present invention provides the advantage that frequent signalling can be avoided between network units when supporting continuous connectivity services, thus reducing resource and power consumption in the network units and reducing error rates.

It is a further advantage of the present invention that the above mentioned set of rules simplifies the coordination of transitions between active and inactive state periods for continuous connectivity services and allows thus a consistent view of whether "normal" or "reduced" activity transmission schemes should be used.

DETAILED DESCRIPTION OF THE INVENTION

Figure 1:
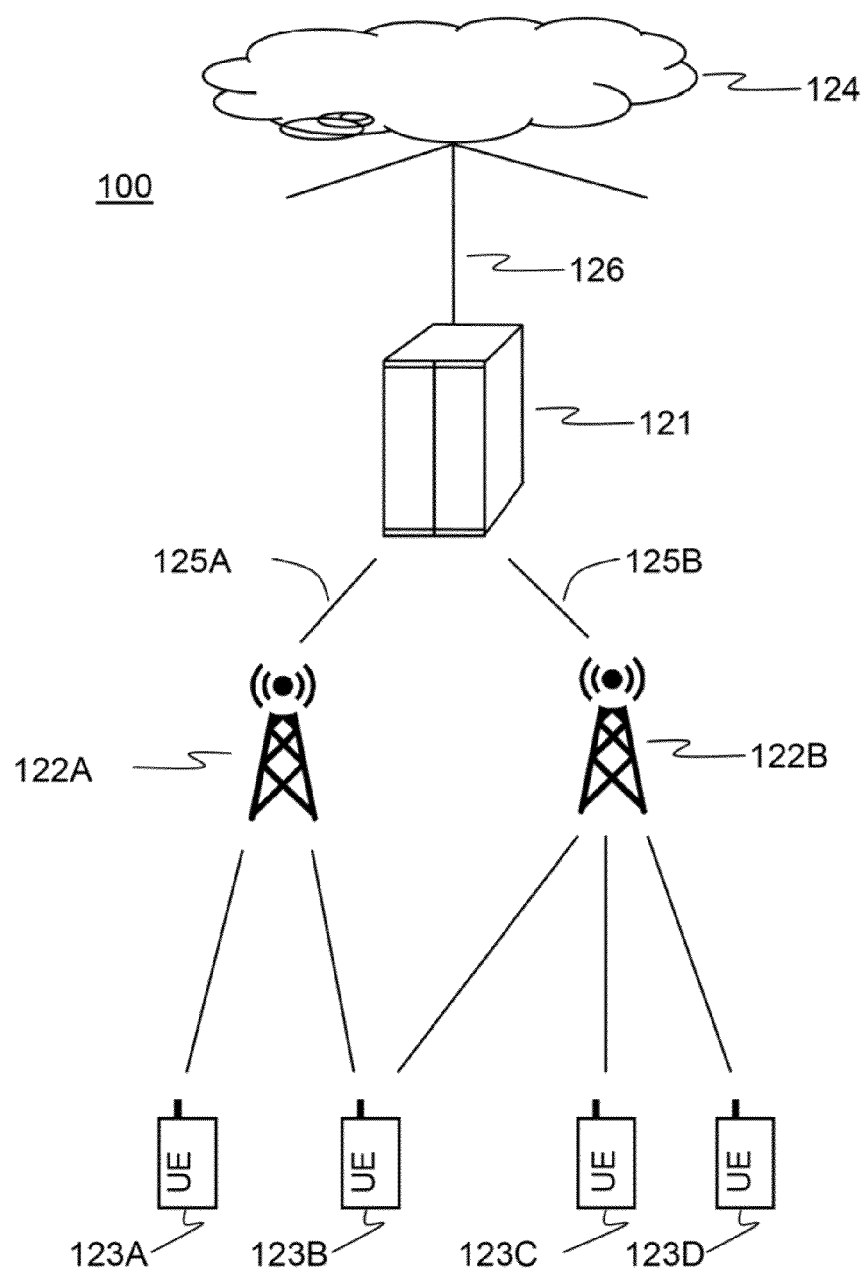
FIG. 1 illustrates the UTRAN architecture with HSDPA and Enhanced Uplink. OPLC stands for Outer Loop Power Control, RLC for Radio Link Control, and ACC for Admission and Congestion Control.
Figure 2:
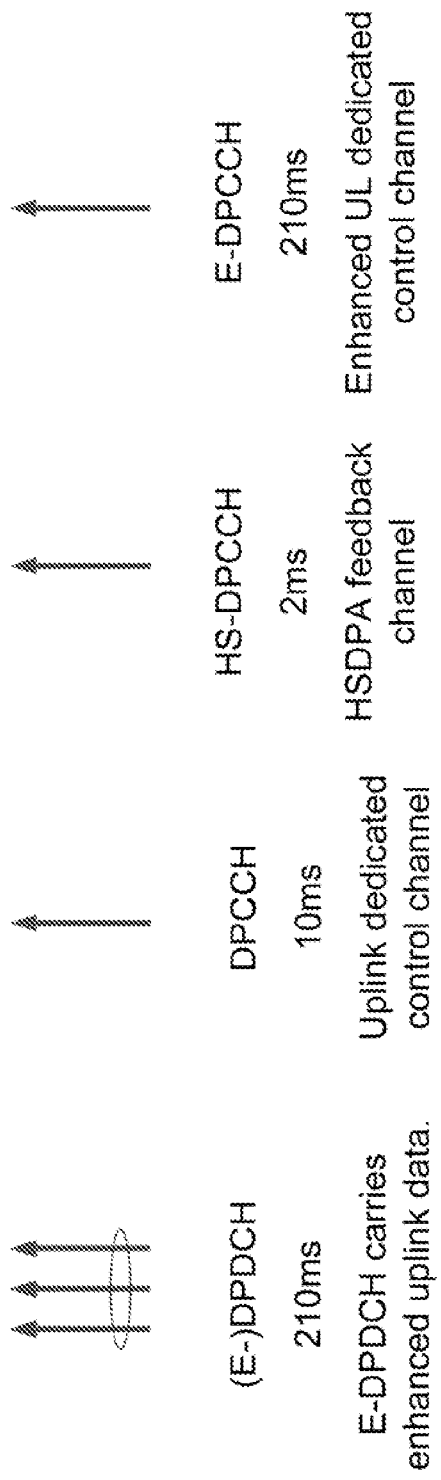
FIG. 2 illustrates uplink channels for a system according to FIG. 1.
Figure 3:
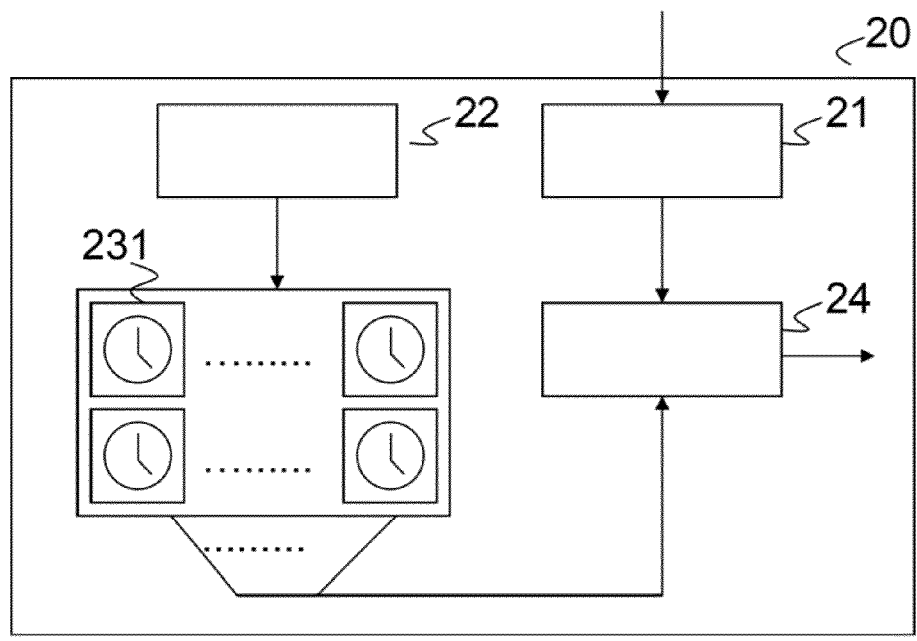
FIG. 3 illustrates a radio base station including the means according to the present invention.
Figure 4:
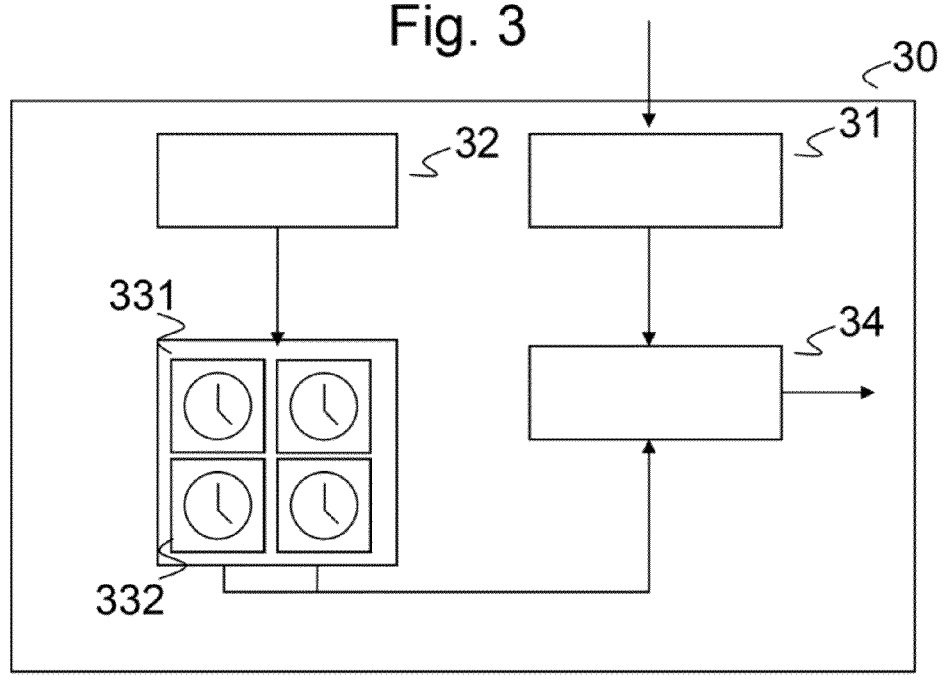
FIG. 4 illustrates a user equipment including the means according to the present invention.

FIG. 1 illustrates a UMTS terrestrial radio access network (UTRAN) as defined in the third generation mobile communications standard 3GPP. The UTRAN 100 includes one or more radio network sub-systems (RNSs) including a Radio Network Controller (RNC) 121 and one or more Node Bs 122A, 122B (the Node B is similar to a radio base station). The Node Bs 122A and 122B are managed by the radio network controller 121 and receive information transmitted from the physical layer of one or more of the user equipments (UE) 123A-123D (sometimes called a mobile terminal) through an uplink channel and transmits a data to one or more of the user equipments 123A-123D through a downlink channel. The Node B acts as an access point of the UTRAN from the UE's point of view and manages, inter alia, scheduling and HARQ mechanisms. The RNC 121 allocates and manages radio resources of the UMTS and is connected to a suitable core network 124 depending on types of services provided to users. The RNC manages, inter alia, Outer Loop Power Control (OLPC), Radio Link Control (RLC), and Admission and Congestion Control (ACC). The RNC in charge of a direct management of the Node B is called a Control RNC (CRNC) managing common radio resources. On the other hand, the RNC that manages dedicated radio resources for a specific UE is called a Serving RNC (SRNC). The CRNC and the SRNC can be co-located in the same physical node. However, if the UE has been moved to an area of a new RNC that is different from SRNC, the CRNC and the SRNC may be located at physically different places. The UMTS includes interfaces that operate as a communication path between various network elements. For example, the interfaces 125A or 125B between a Node B and a RNC is called an Iub interface, and the interface between RNCs is called an Iur interface. The interface between the RNC and the core network 124 is called an Iu interface 126.

As already stated above, it has been perceived to be a problem that previously known solutions rely on the usage of a low layer signalling whereas the present invention relies on methods and arrangements performing certain rules for detecting packet traffic inactivity/activity state transitions, i.e. changes of the transmission activity in continuous connectivity services.

The present invention distinguishes between state transitions perceived on the downlink or uplink. However, it is the common principle that in both cases the unit that detects the need for an inactivity/activity state transition, i.e. base station (using means 22) or user equipment (using means 32), performs this transition, using means 24 or 34, respectively, in accordance with a rule that is also known to the other unit. Thus, for a perceived inactivity/activity state transition, the user equipment will transit to a reduced activity mode while the Node B is aware of this transit due to the fact that both units obey to the same rule and trigger to the same criterion. On the other hand, also the Node B can initiate appropriate measures to reduce interference due to this user equipment and, also in this case, the user equipment is aware of these measures. Said rules can generally be described to include measures that reduce the information transfer on the uplink or downlink to the minimum that is necessary to maintain the connection. A user equipment could, for instance, adapt its CQI reporting or adapt a known DPCCH activity pattern; a Node B could, for instance, adapt the SIR_target.

The present invention relates to a method in a communication system introducing a set of rules commonly known to the Node B 20 and user equipments 30 in order to independently initiate in one of said units a state transition to a reduced activity mode when a predefined criterion has been fulfilled. The following description discloses a non-limiting and non-exhaustive list of embodiments of the present invention with regard to applied rules and criterions for inactivity/activity state transitions. Said rules are either fixed stored in a storing means 21, 31 in the Node B 20 and user equipment 30 or provided to these units by a network controller unit at call setup and can be initiated/performed in either the Node B 20 or the user equipment 30. The rules imply the effect of reduced uplink interference and/or reduced resource usage with regard to power consumption or processing resources.

In a first embodiment of the present invention the applied rule relates to a reduction in the reporting of the channel quality information (CQI): This rule bases on the criterion that there has not been any activity on the High-Speed Downlink Shared Channel (HS-DSCH) for a particular user equipment for a certain time, which is indicated by the fact that a timer 331 or 332 CQI_DTX_Timer has expired. By help of a means 32 for transmission activity detection the user equipment will notice whether it has been recently scheduled or not, providing an indication about the downlink activity on the HS-DSCH and, as a consequence, whether the user equipment shall use a 'normal activity mode' or a 'reduced activity mode' for its uplink CQI reporting. According to the rule implemented in the user equipment 30 and the Node B 20, the user equipment 30 then initiates an adapted CQI reporting on the uplink, i.e. the High-Speed Dedicated Physical Control Channel (HS-DPCCH). For instance, the user equipment starts to report the CQI less frequently and, accordingly, the Node B 20 receives and needs to handle CQI-information from this user equipment 30 less frequently. By this, uplink interference and Node B 20 processing can be reduced. When HS-DSCH activity occurs again with regard to said user equipment, the CQI reporting is restored to the normal CQI feedback cycle.

In contrast to defining only a single CQI reporting pattern whereby a regular reporting interval can be configured, the embodiment of the present invention aims at defining one or more additional CQI reporting patterns, which may have configurable reporting intervals that are different from the first pattern and which are to be used in a 'reduced activity mode'. Hereby, it should be noted that the selection of an uplink CQI-reporting pattern is indirectly associated to the applied UE_DTX pattern on the uplink such that the additional CQI reporting patterns can be given by parameters UE_DTX_cycle_1 or UE_DTX_cycle_2. By means of additional CQI-reporting with configurable reporting intervals it is possible to achieve a solution that does not require signalling. Normally, a user equipment 30 reports the CQI by using the frequent reporting pattern, i.e. it transmits a CQI report once every $x_1$ ms. If the user equipment 30 has not been scheduled for a certain (configurable) time period, it switches to a second, 'reduced activity' CQI reporting pattern, which implies that it reports the CQI every $x_2$ ms, where $x_2 > x_1$. One possible alternative of this embodiment includes also the special case that the CQI reporting pattern leads to a complete switch off of the reporting, i.e. the value $x_i$ is set to infinity. One conceivable implementation of this first embodiment is to arrange a timer 331 or 332 in the user equipment 30 which is (re)started at each time the user equipment is scheduled. When the timer 331 or 332 expires, the user equipment 30 switches from a first reporting pattern to a second reporting pattern with larger reporting time interval than applied for the first reporting pattern. The Node B can use a corresponding timer mechanism 231, one per user equipment, to determine the reporting pattern that is applied by a particular user equipment. Thus, a "CQI off" and "CQI reporting reduction" could be carried out by both the user equipment 30 and the Node B 20 to detect 'inactivity' and 'activity' on the HS-DSCH based on either predefined or configured rules and reducing the CQI reporting interval to a predefined or configured CQI reporting interval during periods of inactivity.

The scheme according to the first embodiment described above can also be generalized for multiple CQI reporting patterns if a gradual reduction in reporting activity is desirable. In this case, the user equipment switches from a first reporting pattern with reporting interval $x_1$ ms to a second reporting pattern with a larger reporting interval $x_2$ ms ($x_2 > x_1$) after a certain time of inactivity on the downlink, to a third reporting pattern with reporting interval $x_3$ ms ($x_3 > x_2 > x_1$) after a still longer time of inactivity, and so on.

Optionally, the selection of the CQI reporting patterns can be done in such a way that $x_1$ is an integer factor in $x_2$, i.e. $x_2 = n \cdot x_1$ where n denotes a positive integer value or, in the generalised case of multiple CQI-reporting patterns, $x_i = n \cdot x_j$ where $i \geq 2$ and $j=1 \ldots (i-1)$. If, for instance, a user equipment and a Node B happen to use different reporting patterns because the user equipment missed the HS-SCCH and the Node B did not detect the absence of an ACK/NAK on the HS-DPCCH, there will nevertheless be at least some reporting events that coincide with this choice of the reporting patterns.

A variant of the first embodiment is to directly relate to the UE_DRX_cycle: If there has not been any activity on the HS-DSCH for a particular user equipment for a certain time, which is indicated by a timer value Inactivity_Threshold_for_UE_DRX_cycle, the user equipment applies a discontinuous transmission denoted by the cycle time UE_DRX_cycle, thus reducing the UE power consumption. The Node B applies a corresponding cycle. When HS-DSCH activity occurs again with regard to said user equipment the user equipment switches back to continuous reception.

A second embodiment of the present invention relates to uplink gating of the Dedicated Physical Control Channel (DPCCH): This rule bases on the criterion that a means 22 has detected that there has not been any activity on the E-DCH for a particular user equipment 30 for a certain time, i.e. the user equipment 30 has currently no data to transmit on the uplink. This time can be expressed either by help of the TTI, e.g. 1TTI, or by help of a timer 231 having value Inactivity_Threshold_for_UE_DTX_cycle_2. According to the rule implemented in the user equipment 30 and the Node B 20, the user equipment 30 will then apply a gated uplink transmission, denoted by a cycle time UL DTX_cycle_1 or, if there is still no E-DCH activity after an even longer time, a second cycle time UE_DTX_cycle_2, which is longer than the first cycle time. A gated transmission implies that transmissions are performed at full power but not in every slot. For instance, when only using every $4^{th}$ transmission slot this would lead to an interference reduction corresponding to a 6 dB SIR target reduction. The user equipment 30 can apply a 'normal activity mode' or a 'reduced activity mode' for transmission of the DPCCH. If the user equipment 30 has not had any data to be transmitted for a certain (configurable) time period, it switches to a second, 'reduced activity' gating cycle for transmissions on the UL DPCCH. One conceivable implementation of this embodiment is to arrange a timer 331 or 332 in the user equipment 30 which is (re)started at each time the user equipment 30 has data to transmit. When this timer expires, the user equipment 30 switches from a first gating cycle to a reduced gating cycle. The Node B 20 can use a corresponding timer mechanism 231, one per user equipment 30, to determine the gating cycle that is applied by a particular user equipment 30. The selection of the gating cycle time can be done in such a way that one cycle period is an integer factor of the other cycle period. The applied rule implies the advantage that uplink interference can be reduced. Correspondingly, the Node B 20 can reduce its listening to the transmissions of the user equipment 30 in accordance with the cycle where the user equipment 30 is allowed to transmit control information on the uplink DPCCH. Also, the Node B 20 can reduce the sending of TPC-commands on the downlink in accordance with the UL DPCCH transmission cycle. When E-DCH activity occurs again with regard to said user equipment, the user equipment switches back to a continuous transmission on the DPCCH.

For a detected inactivity on the Enhanced Uplink also the (serving) Node B 20 can initiate appropriate actions. When a means 22 detects that a certain user equipment 30 has not transmitted any data within a predefined time interval, e.g. by applying a timer 231 with value UE_Inactivity_Threshold, the (serving) Node B 20 can estimate that this user equipment 30 has currently no data in the buffer and initiate appropriate actions. This can include to reduce its power consumption or to reduce interference over the air, e.g., to reduce its listening to the reportings of the user equipment 30 in accordance with the cycle where the user equipment 30 is allowed to transmit control information on the uplink DPCCH or to reduce the sending of TPC-commands on the DL F-DPCH in accordance with the UL DPCCH transmission cycle. A further measure is that when the Node B 20 stops transmission on the F-DPCH, the user equipment 30 correspondingly stops receiving the F-DPCH.

Yet another embodiment relates to an uplink SIR_target reduction. This rule bases on the criterion that a means 32 detects no E-DCH activity of a particular user equipment 30 for a certain time. Then the Node B 20 reduces the UL SIR_target and the user equipment 30 applies, correspondingly, a negative uplink power offset. By this means the uplink interference can be reduced. When E-DCH activity occurs, the user equipment 30 applies a positive uplink power offset and the Node B restores the uplink SIR_target. The Node B 20 detects inactivity and activity of a user equipment 30 based on predefined or configured rules and reduces the SIR_target for this user equipment 30 by a predefined or configured offset during periods of inactivity while restoring the SIR_target to its normal level after having detected the presence of scheduling information from said user equipment 30 such that the inner power control loop will ensure that the user equipment 30 after a couple of slots has adjusted its transmission power to meet the target. A power offset w can be used for the transmission of uplink scheduling information to compensate for the lowered SIR target. Either this power offset is always applied to the scheduling information or separate power offsets are defined, i.e. one power offset $w_1$ that is to be used when the user equipment 30 is transmitting a scheduling information when the buffer previously was empty, and one power offset $w_2$ that is to be used when the scheduling information is transmitted and the buffer previously not was empty.

Yet another embodiment relates to an uplink SIR_target reduction. This rule bases on the criterion that a means 31 detects no E-DCH activity of a particular user equipment for a certain time. Then the Node B reduces the UL SIR_target and the user equipment applies, correspondingly, a negative uplink power offset. By this means the uplink interference can be reduced. When E-DCH activity occurs, the user equipment applies a positive uplink power offset and the Node B restores the uplink SIR_target. The Node B detects inactivity and activity of a user equipment based on predefined or configured rules and reduces the SIR_target for this user equipment by a predefined or configured offset during periods of inactivity while restoring the SIR_target to its normal level after having detected the presence of scheduling information from said user equipment such that the inner power control loop will ensure that the user equipment after a couple of slots has adjusted its transmission power to meet the target. A power offset w can be used for the transmission of uplink scheduling information to compensate for the lowered SIR target. Either this power offset is always applied to the scheduling information or separate power offsets are defined, i.e. one power offset $w_1$ that is to be used when the user equipment is transmitting a scheduling information when the buffer previously was empty, and one power offset $w_2$ that is to be used when the scheduling information is transmitted and the buffer previously not was empty.

The implementation of the above mentioned rules and mechanisms requires a higher layer signalling between, e.g., the radio network controller (RNC) and the user equipment for configuring, e.g., the power offsets $w_i$ and/or the CQI reporting intervals $x_i$. This signalling typically only takes place once at call setup and thus does not lead to a significant increase in interference. Signalling is also required between the RNC and Node B for configuring the SIR target reduction z or the CQI reporting patterns $x_i$, e.g. the time intervals of the patterns and the order in which they are to be selected. As an alternative, these parameters can be implemented in a fixed way rather than signalled from the radio network controller (RNC).

While the invention has been described in connection with what is presently considered to be the most practical and preferred embodiments, it is to be understood that the invention is not to be limited to the disclosed embodiment but is intended to also cover various modifications and equivalent arrangements included within the scope of the appended claims.

The invention claimed is:

1. A method in a communication system comprising a plurality of interconnected communication units, including one or more radio base stations and one or more user equipments, the method comprising:
   introducing a set of rules commonly known to the radio base stations and user equipments in order to independently initiate or perform in one of said communication units a state transition to or from a reduced transmission activity mode when a predefined criterion has been fulfilled, wherein the predefined criterion relates to activity or inactivity of the one of said communication units; and
   applying the set of rules by the one of said communication units, wherein applying comprises:
      maintaining a plurality of timers for uplink and downlink transmission directions;
      storing timer expiration values;
      indicating that a timer has expired;
      restarting the timer of the one of said communication units if transmission activity has been detected to or from the one of said communication units; and
      detecting, by the one of said communication units, without signaling between the other of said communication units, that the predefined criterion has been fulfilled; and
      independently initiating, by the one of said communication units, the state transition.

2. The method according to claim 1, whereby a user equipment applies the set of rules including the steps of
   determining that a timer for scheduling the user equipment on a High-Speed Downlink Shared Channel (HS-DSCH) has expired; and
   selecting in a predefined order a channel quality information (CQI) reporting pattern out of a predefined set of one or several CQI-reporting patterns with configurable reporting intervals.

3. The method according to claim 2, whereby the reporting intervals of the CQI-reporting pattern differ in an integer factor from each other.

4. The method according to claim 2, whereby the predefined order of the CQI-reporting patterns is such that a gradual increase of the reporting intervals is achieved.

5. The method according to claim 2, whereby the CQI-reporting pattern is defined with infinite reporting interval.

6. The method according to claim 2, further comprising the step of restarting the timer each time the user equipment has been scheduled for the HS-DSCH.

7. The method according to claim 1, whereby a base station applies the set of rules including the steps of
   maintaining for each user equipment a separate timer;
   adapting to a channel quality information (CQI) reporting pattern that is applied by a user equipment in accordance with said rule each time the timer expires; and restarting the timer for the user equipment each time that user equipment has been scheduled on a High-Speed Downlink Shared Channel (HS-DSCH).

8. The method according to claim 1, whereby a user equipment applies the set of rules including the steps of
determining that a timer for scheduling the user equipment on a High-Speed Downlink Shared Channel (HS-DSCH) has expired; and
switching to a discontinuous reception of downlink physical channels applying a downlink cycle time.

9. The method according to claim 1, whereby a base station applies the set of rules including the steps of:
maintaining for each user equipment a separate timer to determine a downlink cycle time for a discontinuous reception of downlink physical channels that is applied by the user equipment; and
adapting a High-Speed Downlink Shared Channel (HS-DSCH) scheduling of the user equipment in accordance with said downlink cycle time.

10. The method according to claim 1, whereby a user equipment applies the set of rules including the steps of
determining that a first timer for transmitting data to a base station on an enhanced dedicated channel (E-DCH) has expired;
switching to a gated transmission on an uplink Dedicated Physical Control Channel (DPCCH) applying a first uplink cycle time.

11. The method according to claim 10, further comprising the steps of:
determining that a second timer for transmitting data to the base station on the E-DCH has expired;
switching to a second uplink cycle time, longer than said first uplink cycle time, for the gated transmission on the uplink DPCCH.

12. The method according to claim 10, further comprising the step of restarting the first timer each time the user equipment transmits data on the E-DCH to the base station.

13. The method according to claim 1, whereby a base station applies the set of rules including the steps of:
maintaining for each user equipment a separate timer to determine an uplink cycle time for a gated transmission on an uplink Dedicated Physical Control Channel (DPCCH) that is applied by the user equipment; and
performing one or more of the steps of adapting the listening to the user equipment in accordance with said uplink cycle time, reducing the sending of TPC-Transmit Power Control (TPC) commands to the user equipment in accordance with said uplink cycle time.

14. The method according to claim 1, whereby a base station applies the set of rules including the steps of
reducing a signal-to-interference ratio target SIR_target for an uplink enhanced dedicated channel of the user equipment by a predefined offset if a certain period of inactivity has been detected; and
restoring the SIR_target for said uplink if scheduling information has been received from said user equipment.

15. The method according to claim 1, whereby a user equipment applies the set of rules including the steps of
adapting a negative uplink power offset after a certain period of inactivity; and
adapting a positive uplink power offset if data is to be scheduled.

16. The method according to claim 1, further comprising the step of providing said set of rules as a fixed implementation in a base station and a user equipment.

17. The method according to claim 1, further comprising the step of receiving said set of rules at call setup from a network controller unit.

18. A radio base station in a communication system comprising a plurality of interconnected network nodes, said radio base station communicating with one or more user equipments, the radio base station comprising:
a memory; and
a processor being configured, when executing program instructions stored in the memory, for:
storing a set of rules to independently initiate or perform a state transition to or from a reduced transmission activity mode when a predefined criterion has been fulfilled;
detecting transmission activity on an uplink and a downlink;
maintaining a plurality of timers, one for each user equipment and uplink and downlink transmission directions;
storing of timer expiration values,
indicating that a timer has expired, and
restarting the timer of the user equipment if transmission activity has been detected to or from said user equipment;
performing said state transition in accordance with one of said stored set of rules for a user equipment with an expired timer.

19. The radio base station according to claim 18, wherein said set of rules is fixed implemented in said memory for storing the set of rules.

20. The radio base station according to claim 18, wherein said set of rules is provided by a network controller node.

21. A user equipment in a communication system comprising a plurality of interconnected network nodes, said user equipment connected to one or more base stations, the user equipment comprising:
a memory; and
a processor being configured, when executing program instructions stored in the memory, for:
storing a set of rules to independently initiate or perform a state transition to or from a reduced transmission activity mode when a predefined criterion has been fulfilled;
detecting transmission activity on an uplink and a downlink;
maintaining timers for each uplink and downlink transmission direction;
storing of timer expiration values,
indicating that a timer has expired, and
restarting the timer if transmission activity has been detected to or from said user equipment;
performing said state transition in accordance with one of said stored rules for the user equipment with an expired timer.

22. The user equipment according to claim 21, wherein said set of rules is fixed implemented in said memory for storing the set of rules.

23. The user equipment according to claim 21, wherein said set of rules is provided by a network controller node.

* * * * *